Figure 3:
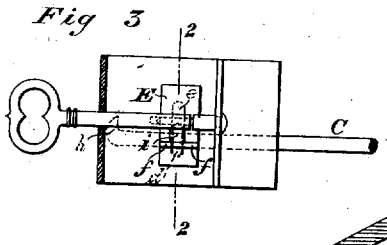

J. H. BEIDLER.

Assignor to T. F. Keating.

POST OFFICE BOX.

No. 7,623.

Reissued April 24, 1877.

WITNESSES

Wm. A. Skinkle.

J. Fitch.

INVENTOR

Jacob. H. Beidler.

By his Attorneys

Baldwin, Hopkins, & Peyton

N. PETERS, PHOTO-LITHOGRAPHER, WASHINGTON, D. C.

UNITED STATES PATENT OFFICE.

JACOB H. BEIDLER, OF LINCOLN, ILL., ASSIGNOR TO THOMAS F. KEATING, OF PITTSBURG, PA.; SAID KEATING ASSIGNOR TO THE YALE LOCK MANUFACTURING COMPANY, OF STAMFORD, CONN.

IMPROVEMENT IN POST-OFFICE BOXES.

Specification forming part of Letters Patent No. 57,464, dated August 28, 1866; reissue No. 7,623, dated April 24, 1877; application filed March 28, 1877.

*To all whom it may concern:*

Be it known that I, JACOB H. BEIDLER, of Lincoln, in the county of Logan and State of Illinois, have invented certain new and useful Improvements in Mail-Delivery Boxes for Post-Offices; and I do hereby declare that the following is a full and exact description thereof, reference being had to the accompanying drawings, and to the letters of reference marked thereon.

My invention consists, primarily, in a post-office mail-delivery box with an outside door fastened by a lock and key operated from without.

I have shown the lock located in one of the sides of the box; but the location is not a material part of my invention.

I provide, also, an inside alarm-bell and indicator, so constructed and arranged that the act of turning the key to unlock the door will necessarily cause the alarm-bell to be struck or rung, and indicate to the attendant inside what box has been opened or unlocked.

My invention consists, secondarily, in the peculiar mechanism by which these results are effected, and by means of which, also, the postmaster or attendant inside is enabled readily to unlock the box-door without the use of a key, or to secure it in the locked condition, so that on all proper occasions he can keep the contents of the box under his control, and, if need be, prevent the holder of the key from obtaining access thereto.

This provision is of great convenience, as it enables the postmaster to close the box whenever the renter is in arrears for rent, or whenever extra postage is due upon letters, or when, for any reason, he desires to communicate with the box-renter on the occasion of his calling at the post-office.

The importance of providing glazed doors to close the outside ends of post-office delivery-boxes, or "pigeon-holes" as they were more properly termed, when their outside ends were permanently closed, has been heretofore appreciated, and a patent, No. 53,562, was granted to Wm. H. Bramble, April 3, 1866, showing the improvement referred to. The invention of said Bramble transformed the old post-office pigeon-hole into a delivery-box, and relieved post-office officials from the necessity of going first to the box, when summoned by call, and then back with the contents of the box to the delivery-window, and enabled them to deliver the contents of the box through its door, thus diminishing their own labor and facilitating the speedy delivery of mails; but with this invention, as with the old post-office pigeon-holes, the services of postmasters or of their representatives to effect the delivery of the mails were always required, and in large cities, and even in populous villages, the mail-deliveries consequently involved great labor on the part of officials, were necessarily dilatory, and this branch of the postal service was correspondingly cumbered and unsatisfactory to the public.

The object of my invention is to remedy these evils, and to enable the delivery of mail to be effected by the receivers themselves without any other service on the part of postal officials than the proper distribution of the mails, whereupon the receivers, provided with differing keys, may quietly and simultaneously open and take out their respective mails without waiting, confusion, or difficulty. My invention is essentially, therefore, a post-office lock-box, as contradistinguished from what was before known as a post-office delivery-box, or call-box, and is designed as an improvement on the latter.

Figure 1:
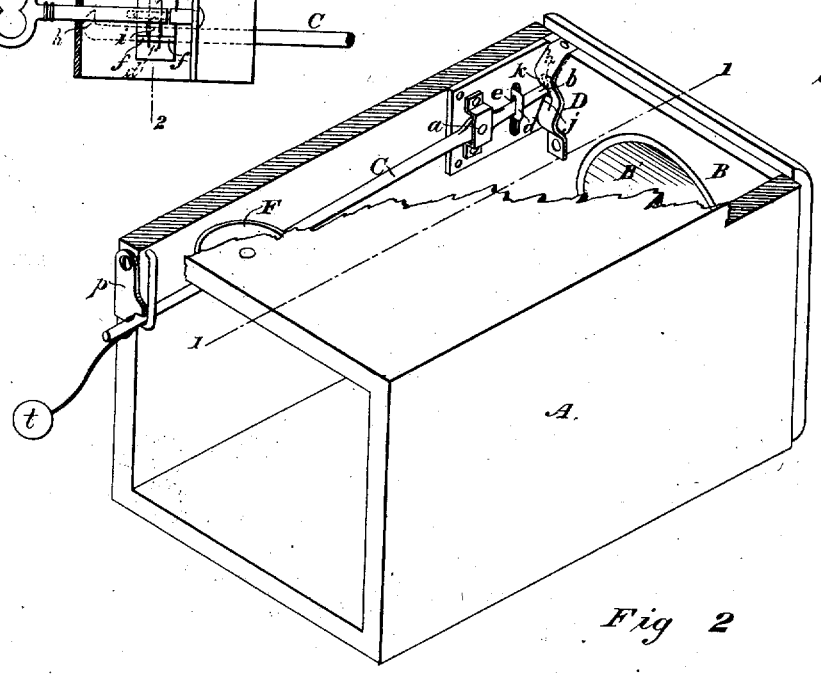
Figure 4:
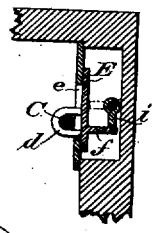
Figure 2:
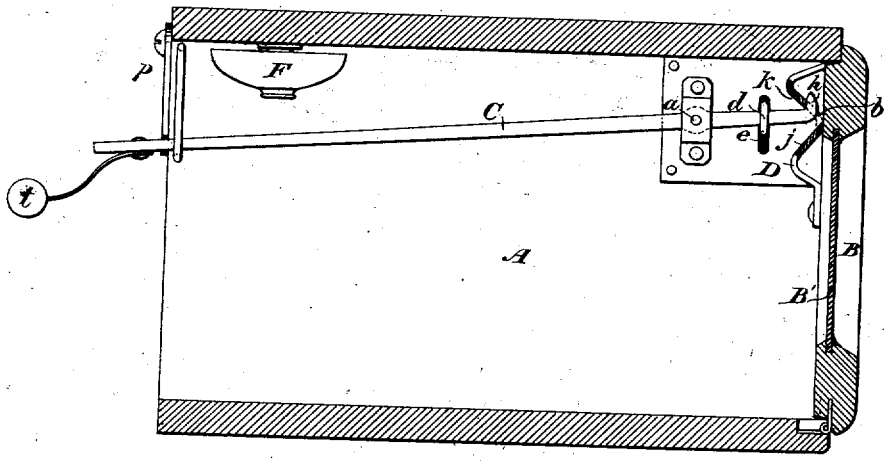

In the accompanying drawings, Figure 1 is a perspective view of the box, with the top partly broken away to show the mechanism by means of which the turning of the key causes the bell to be struck or rung. Fig. 2 is a sectional view on the line 1 1 of Fig. 1. Fig. 3 is a view of the interior of the lock when removed from the side wall of the box. Fig. 4 is a section on the line 2 2 of Fig. 3.

Like letters indicate the same parts in all the figures.

A is the letter-box; B, the door, opening outwardly by a vertical fall, so hung that it can only fall to a horizontal position; and B′ is a glass panel in the door, on which the number of the box may be indicated by figures. C is a lever, lock-bolt, and bell-hammer, extending from the lock to the inner end of the box, and turning upon a fulcrum, *a*. D is a corrugated metallic plate attached to the inside of the door, with a notch, *b*, in one edge, into which a hook, *h*, on the front end of the lever lock-bolt enters, and locks the door when closed. E is a sheet-metal sliding plate on the inside of the lock-plate, with a staple, *d*, passing through a vertical slot, *e*, in the lock-plate, and connecting with the front end of the lever C on the reverse side of the lock-plate. A flange, *f*, projects from the sliding plate E, with which the key engages on being turned to unlock the door. F is the alarm-bell, so attached to the inner end of the box that the inner end of the lever C will strike it on being operated by turning the key, and *p* is a pawl pivoted to the inner end of the side plate of the box, by means of which the lever C can be fastened down by a person inside, so that the door cannot be unlocked from without until said pawl is turned aside from the lever.

The operation of the machine or device is as follows:

The door being locked by means of the hook on the front end of the lever C engaging with the corrugated plate D in the notch *b*, to unlock the door, the key is inserted and turned from right to left, when the projection *i* of the key engages with the flange *f* of the sliding plate and depresses it, the staple *d* moving in the vertical slot *e*, and carrying with it the front end of the lever lock-bolt, disengaging the hook *h* from the corrugated plate. As the front end of the lever descends it strikes the inclined plane of the corrugated plate at *j* and starts the door open. At the same time the inner end of the lever ascends and strikes the bell with sufficient force to give the alarm to the postmaster or other attendant inside. A vibrating tag, *t*, may be attached to the inner end of the lever or bell-hammer, which will remain in motion long enough after the blow to indicate the box which has been unlocked.

The door is self-locking, because, when shutting, the inclined plane of the corrugated plate (shown at *k*) strikes against the hook *h*, and depresses it until it enters the notch *b* and locks the door.

The postmaster or inside attendant can unlock the door by raising the inner end of the lever, which it may be desirable to do when the box-owner applies for his mail without having his key.

It is manifest that an indefinite variety of keys may be made by varying the wards, &c., so that no one key will open any two doors at the same office.

The alarm-bell is used for divers purposes, and is especially useful as a means of detecting attempts to rifle the boxes by means of false keys.

Having thus fully described my invention, and the mode of carrying it into operation, what I claim as my invention, and desire to secure by Letters Patent, is—

1. A post-office delivery-box open at one end for the insertion of mail-matter, and closed at the other by a door secured by a key-lock, substantially as and for the purposes described.

2. The combination of a post-office mail-delivery box, open at one end for the insertion of mail-matter, and closed at the other end by a door provided with a key-lock, and a fastening device, by means of which the post-office officials on the inside can permit or prevent access to the interior of the box from the outside at will, without the use of a key, substantially as described.

3. In combination with a post-office lock-box, a locking-lever capable of being operated by a key from without, pivoted to the box and extending to the rear, so as to be readily reached and operated by the postmaster from within, and a corrugated locking-plate secured to the inside of the box-door, whereby the postmaster can open the door without the use of a key, and can prevent it from being opened by a key from without, substantially as set forth.

4. In combination with a post-office lock-box, a locking-lever capable of being operated by a key from without, pivoted to the box and extending to the rear, so as to be readily reached and operated by the postmaster from within, and an inclined face or projection, substantially as described, on the inside of the box-door, against which the locking-lever strikes to start the door open, substantially as set forth.

5. In combination with a post-office lock-box, a locking-lever capable of being operated by a key from without, pivoted to the box and extending to the rear, so as to be readily reached and operated by the postmaster from within, and an alarm-bell, the whole so arranged that the turning of the key to unlock the door will cause the bell to be struck by the lever, substantially as set forth.

6. In combination with a post-office lock-box, a locking-lever capable of being operated by a key from without, pivoted to the box and extending to the rear, so as to be readily reached and operated by the postmaster from within, and a vibrating tag for indicating to the postmaster the box that has been unlocked, substantially as set forth.

JACOB H. BEIDLER.

Witnesses:

CHARLES A. KIMMEL,
A. J. BELL.